US009348583B2

(12) United States Patent
Goldstein et al.

(10) Patent No.: US 9,348,583 B2
(45) Date of Patent: May 24, 2016

(54) AUTOMATIC UNTANGLING CYCLIC DEPENDENCIES IN SOFTWARE SYSTEMS

(71) Applicant: International Business Machines Corporation, Armonk, NY (US)

(72) Inventors: Maayan Goldstein, Holon (IL); Dany Moshkovich, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 13/751,165

(22) Filed: Jan. 28, 2013

(65) Prior Publication Data

US 2014/0215435 A1 Jul. 31, 2014

(51) Int. Cl.
*G06F 9/44* (2006.01)

(52) U.S. Cl.
CPC ........................................ *G06F 8/72* (2013.01)

(58) Field of Classification Search
CPC ......... G06F 9/44552; G06F 8/51; G06F 8/72; G06F 9/3855
USPC ......... 717/137, 139, 160, 161, 144, 154, 131, 717/174; 716/113, 106, 102, 110; 707/798, 707/83; 709/249; 719/313; 706/13, 46
See application file for complete search history.

(56) References Cited

U.S. PATENT DOCUMENTS

| | | | |
|---|---|---|---|
| 7,127,707 B1 * | 10/2006 | Mishra et al. | 717/137 |
| 7,752,559 B1 * | 7/2010 | Szpak et al. | 715/764 |
| 2007/0162903 A1 * | 7/2007 | Babb et al. | 717/154 |
| 2008/0052675 A1 * | 2/2008 | Wookey | 717/120 |
| 2011/0067017 A1 * | 3/2011 | Ghosh-Roy et al. | 717/155 |
| 2011/0219368 A1 * | 9/2011 | Festi | 717/174 |
| 2011/0239184 A1 | 9/2011 | Feigen | |
| 2013/0055247 A1 * | 2/2013 | Hiltgen et al. | 718/1 |

OTHER PUBLICATIONS

Robert Tarjan, "Depth-First Search and Linear Graph Algorithms", Jun. 1972, pp. 146-160 <DFS_Tarjan.pdf>.*
Stan, "Stan —Structure Analysis for Java", Version 2, White Paper, Fall 2009. URL: http://stan4j.com/papers/stan-whitepaper.pdf.
Nick Harrison, "Using .NET Reflector to Manage Complex Software Dependencies", Simple Talk, Feb. 23, 2009. URL: http://www.simple-talk.com/dotnet/.net-tools/using-.net-reflector-to-manage-complex-software-dependencies/.
Demetrescu et al., "Combinatorial Algorithms for Feedback Problems in Directed Graphs", In Information Processing Letters, vol. 86, Issue 3, pp. 129-136, May 2003.
Bar-Yehuda et al., "Approximation Algorithms for the Feedback Vertex Set Problem with Applications to Constraint Satisfaction and Bayesian Inference", SIAM Journal on Computing, vol. 27, Issue 4, pp. 344-354, Jul. 28, 2006.
Laval et al., "Cycles Assessment with CycleTable", RMoD Team INRIA—Lille Nord Europe—USTL—CNRS UMR 8022 Lille, France, 2011.

(Continued)

*Primary Examiner* — Tuan Vu

(57) ABSTRACT

A computerized method, system and computer product for untangling cyclic dependencies between components in software architecture is disclosed. The method includes receiving a software architecture that includes a set of components wherein the components include further elements. The method includes finding one or more cyclic dependencies between the set of components and creating a set of rearranged untangled components. The method includes outputting the rearranged components.

10 Claims, 10 Drawing Sheets

(56) References Cited

OTHER PUBLICATIONS

Abdeen et al., "Automatic Package Coupling and Cycle Minimization", In International Working Conference on Reverse Engineering (WCRE), pp. 103-112, 2009.

Laval et al., "Identifying cycle causes with Enriched Dependency Structural Matrix", In WCRE '09: Proceedings of the 2009 16th Working Conference on Reverse Engineering, Lille, France, 2009.

Ducasse et al., "Package Surface Blueprints: Visually Supporting the Understanding of Package Relationships", In ICSM—International Conference on Software Maintenance, pp. 94-103, 2007.

* cited by examiner

| Package | OS | IT | IS | OT |
|---------|----|----|----|----|
| P1 | C1,C2,C3 | C1,C2,C3 | C6,C7,C10 | C4,C5,C7,C8,C9,C11 |
| P2 | C6,C7 | C4,C5,C7 | C1,C2,C3,C10 | C2,C3,C8,C9,C11 |
| P3 | C10 | C8,C9,C11 | C1,C2,C3,C6,C7 | C1,C2,C3,C4,C5,C7 |

AUTOMATIC UNTANGLING CYCLIC DEPENDENCIES IN SOFTWARE SYSTEMS

BACKGROUND

The present invention, in some embodiments thereof, relates to modular software architectures and, more specifically, but not exclusively, to a computerized method for untangling cyclic dependencies between components in software architectures.

Software systems tend to suffer from various architectural problems and their modularity deteriorates due to changes and further development processes as they evolve. A major problem that software system architects need to address is cyclic dependencies between different parts of the architecture. Cyclic dependencies may occur when a newly added element (a class, for example, in object oriented languages) is added to a wrong component (package) or due to improper refactoring. Eliminating the cyclic dependencies saves development and/or testing time, preserves better organized system architecture and facilitates reuse of software components.

Various techniques may be used to eliminate manually cyclic dependencies by moving classes between packages or methods between classes and by changing the design of the system such as introducing new interfaces and abstract classes to break the cyclic dependencies.

A simulated-annealing automated approach for resolving the dependencies between two cyclically dependent packages was recently proposed by Abdeen et al in "Automatic Package Coupling and Cycle Minimization", IEEE Computer Society, 2009, pp 103-112. The approach uses a simulated-annealing based heuristic algorithm to move classes between pairs of packages in order to remove cyclic dependencies between package pairs.

SUMMARY

According to an aspect of some embodiments of the present invention there is provided a computerized method for untangling cyclic dependencies between components in a software architecture. The computerized method includes receiving a software architecture that includes a plurality of components wherein the components include further pluralities of elements and finding at least one cyclic dependency between the plurality of components. The computerized method includes creating a plurality of rearranged untangled components and outputting the plurality of rearranged components.

According to a further feature of an embodiment of the present invention, a computerized system for untangling at least one cyclic dependency between components in a software architecture is provided. The computerized system includes a storage medium for receiving a set of components of a software architecture and for storing a program code. The computerized system includes a processor for executing the program code wherein the processor is programmed to receive a software architecture that includes a plurality of components that include further pluralities of elements. The processor is programmed to find at least one cyclic dependency between the plurality of components, to create a plurality of rearranged untangled components and to output the plurality of rearranged components.

According to a further feature of an embodiment of the present invention, a computer program product for untangling at least one cyclic dependency between components in a software architecture is provided. The computer program product includes a computer readable storage medium, first program instructions to receive a software architecture that includes a plurality of components wherein the components includes further pluralities of elements, second program instructions to identify at least one cyclic dependency between the plurality of components, third program instructions to create a plurality of rearranged untangled components, fourth program instructions to output the plurality of rearranged components, wherein the program instructions are stored on the computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Additional features and advantages of the invention will become apparent from the following drawings and description.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is a table that lists the sorted groups of each package of the exemplary SCC, according to some embodiments of the present invention;

DETAILED DESCRIPTION

Figure 1A:
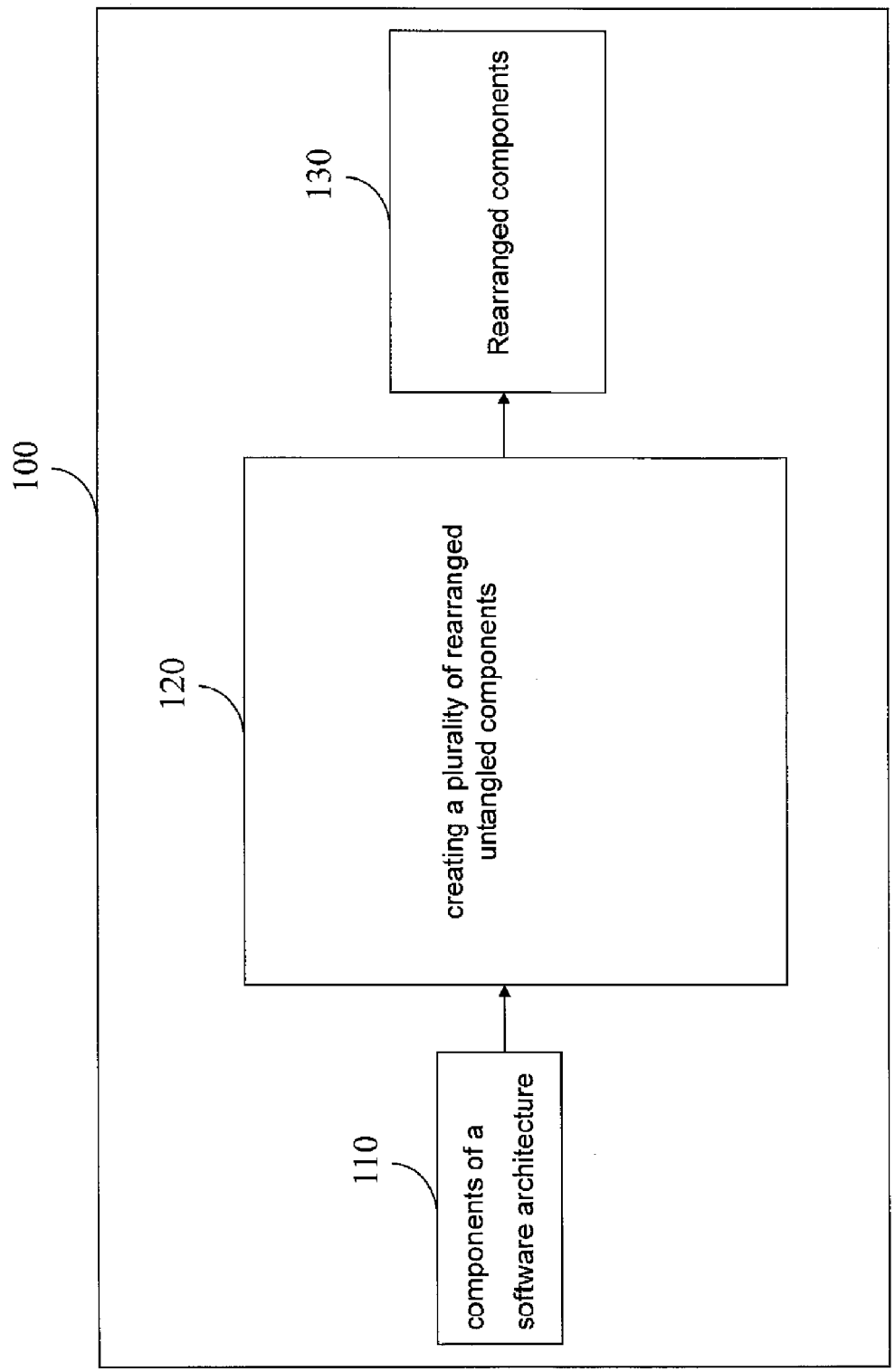
FIG. 1A is a block diagram that illustrates a computerized method for untangling cyclic dependencies between components in a software architecture, according to some embodiments of the present invention.

According to some embodiments of the present invention, methods, systems and computer products for untangling cyclic dependencies between components in software architecture are provided. The methods, systems and computer products disclose a computerized solution for untangling direct and/or indirect (i.e. transitive) cyclic dependencies between software components. The disclosed method aim is to change as little as possible the system architecture performing the minimal number of changes required for untangling cyclic dependencies since from the users perspective, altered architectures create a gap between the user's knowledge of the system and the real code.

As used herein, the term software components means software C++ packages, Java packages, C++ classes, Java classes, folders, projects, files and hardware modules.

As used herein, the term software elements means C++ classes, Java classes, C++ methods, Java methods, C functions, files and hardware cells.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1A, which is a block diagram that illustrates a computerized method 100 for untangling cyclic dependencies between components in a software architecture, according to some embodiments of the present invention. Computerized method 100 is used to untangle direct and/or indirect (i.e. transitive) cyclic dependencies between components of software architecture 110 and, creating a set of rearranged untangled components. Computerized method 100 is not limited to direct cyclic dependencies between two components like Abdeen et al "Automatic Package Coupling and Cycle Minimization" simulated-annealing automated approach that cannot untangle indirect (transitive) cyclic dependencies between more than two components.

Next, computerized method 100 creates rearranged untangled components 120. Computerized method 100 finds first strongly connected components (SCCs), which are cyclically depended groups of components in order to reduce the size of the untangling problem.

Computerized method 100 minimizes the impact on the overall system architecture by sorting software elements to groups, according to their incoming and outgoing dependencies on other software elements of other components in each component as described herein further below.

Computerized method 100 untangles first the component in each SCC that has the sorted smallest group of elements and recursively repeats untangling components that have the sorted smallest group of elements in each iteration until all components of the SCC and the software architecture are untangled. Untangling first the component in each SCC that has the sorted smallest group of elements is an exemplary heuristic. Other untangling heuristics may be defined and the present invention is not limited to the exemplary heuristic described herein above.

Finally, Computerized method 100 outputs the rearranged untangled components 130. As used herein, the terms isolated component and untangled component means a component that has no cyclic dependencies on other components of the software architecture and the two terms are used interchangeably herein below.

Figure 1B:
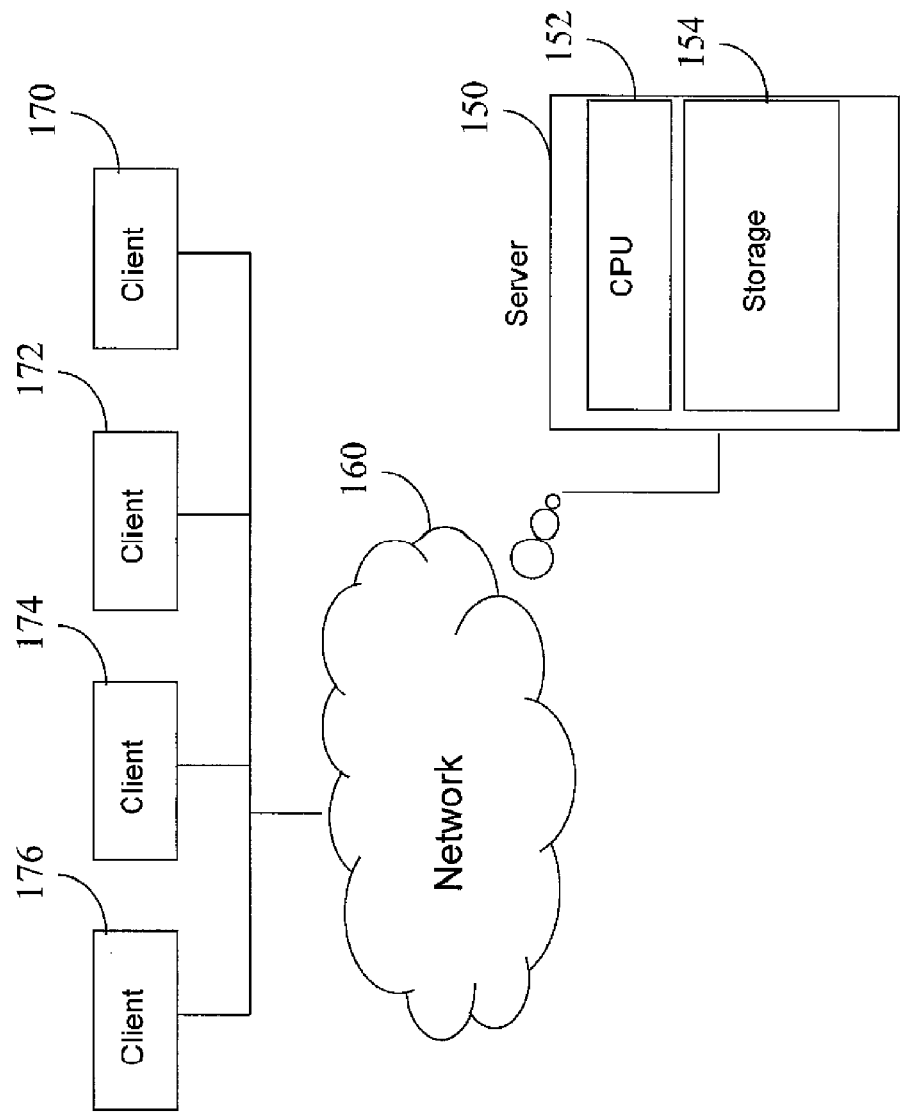
FIG. 1B is a block diagram that illustrates a server and clients, which are connected over via a network, that execute a process for untangling cyclic dependencies between components in a software architecture, according to some embodiments of the present invention.

FIG. 1B is a block diagram that illustrates a server and clients, which are connected via a network, that execute a process for untangling cyclic dependencies between components in a software architecture, according to some embodiments of the present invention. Computerized method 100 illustrated in FIG. 1A, may be used to untangle components in server device 150 and/or in clients 170, 172, 174 and 176 connected to the server via network 160. Server device 150 includes a central processor unit (CPU) 152 used to execute computerized method 100 and a storage medium 154 used to store program code, to receive plurality of components of a software architecture and to store the rearranged components. Components of software architecture may be distributed to clients 170, 172, 174 and 176 and computerized method 100 may be invoked by each one of the clients 170, 172, 174 and 176 to untangle cyclic dependencies in order to create a set of rearranged untangled components that execute more efficiently. Server device 150 may be a SaaS (Software as a Service) provider server for example and clients 170, 172, 174 and 176 may be the SaaS provider clients.

According to some embodiments of the present invention, computerized method 100 may be executed by server 150 and a set of rearranged untangled components may be generated and distributed through network 160 to the clients 170, 172, 174 and 176.

Figure 2:
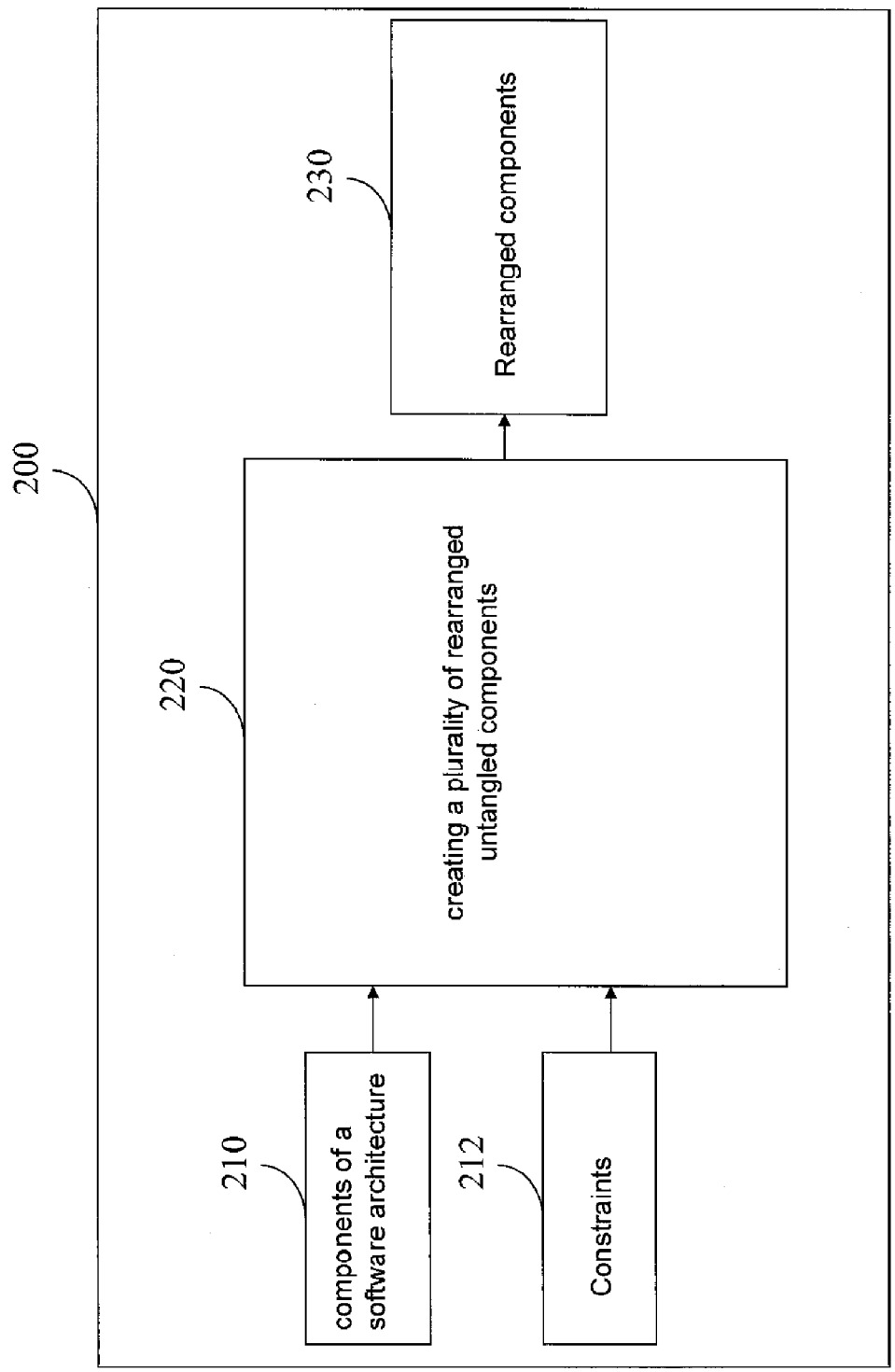
FIG. 2 is a block diagram that illustrates the computerized method receiving input constraints, according to some embodiments of the present invention.

FIG. 2 is a block diagram that illustrates the computerized method 100 receiving input constraints, according to some embodiments of the present invention. Constraints 212 may be included in addition to the received components of the software architecture 210. Computerized method 100 that creates the set of rearranged components 220 is configured to take into account constraints 212 that may be defined by users for example. In this case the output rearranged components 230 might include cyclic dependencies due to the constraints included 212.

For example, users may define unmovable elements, minimal and maximal number of elements requested in each component, a forced hierarchical relation between components and combinations thereof. These architecture constraints may be defined by users in order to preserve critical architectural structure they prefer and find beneficial. For example, the maximal number of elements in a single component may be set to 100. In this case, the computerized method 200 will not untangle SCCs that include more than 100 elements in a single cyclic dependency and completely and these cyclic dependencies may remain in the output architecture. However, it may untangle some of the elements thus reducing the size of the corresponding SCC.

Figure 3:
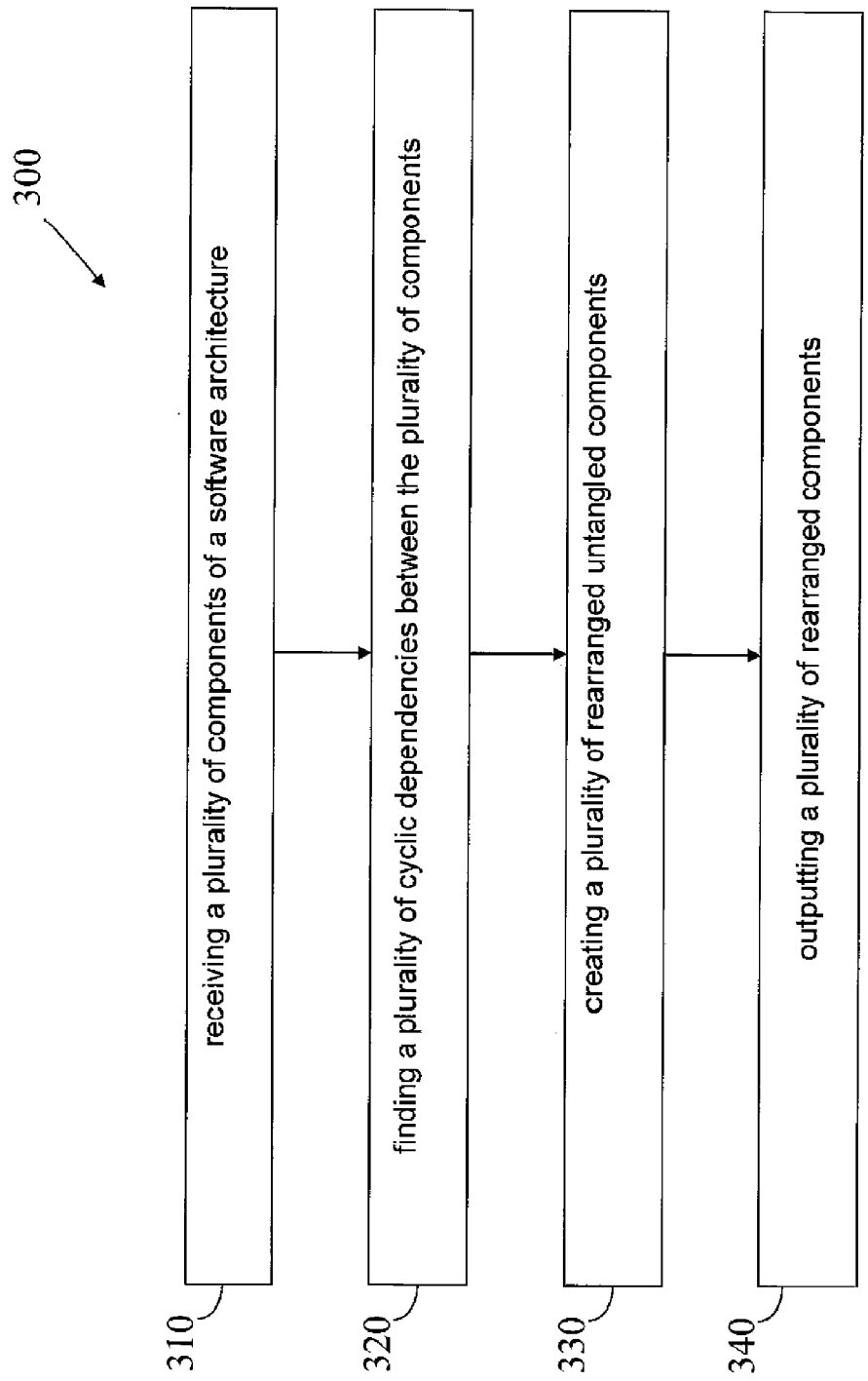
FIG. 3 is a flowchart that illustrates the computerized method of FIG. 1, according to some embodiments of the present invention.

FIG. 3 is a flowchart that illustrates the computerized method of FIG. 1, according to some embodiments of the present invention. Computerized method 300 includes: receiving a set of components of a software architecture 310 and finding one or more cyclic dependencies between the received components 320. Next, computerized method 300 creates a set of rearranged untangled components 330. Finally, computerized method 300 outputs the set of rearranged components 340.

Figure 4:
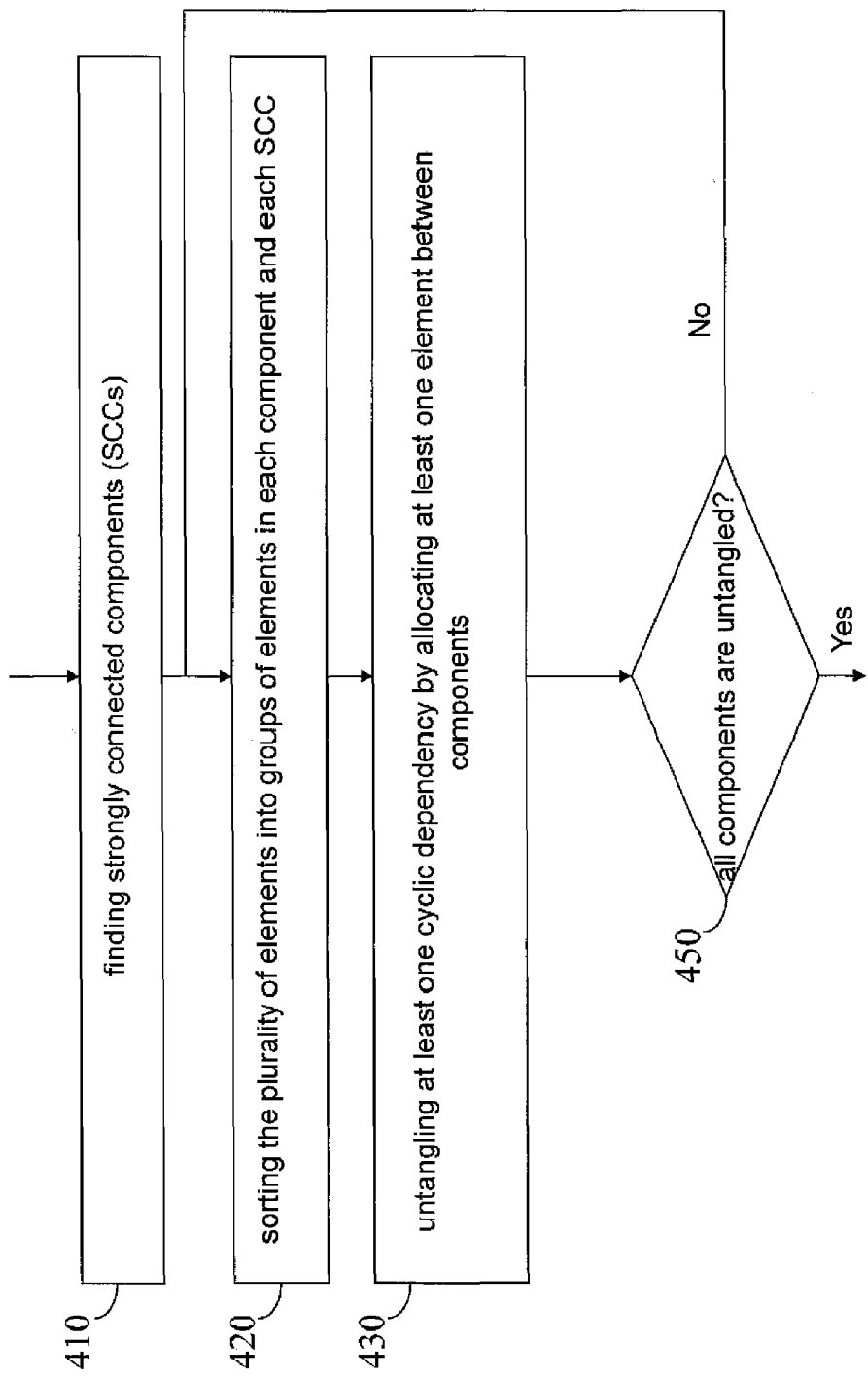
FIG. 4 is a flowchart that illustrates a process of creating iteratively a one or more of rearranged components in order to untangle cyclic dependencies, according to some embodiments of the present invention.

FIG. 4 is a flowchart that illustrates the process of creating iteratively one or more of rearranged components in order to untangle cyclic dependencies, according to some embodiments of the present invention. The process of creating the set of rearranged untangled components, FIG. 3 330, includes finding SCCs 410 in the software architecture in order to reduce the size of the untangling problem and sorting elements into groups in each component of each SCC 420. Process 330 includes untangling one or more cyclic dependencies by moving one or more elements between components according to the sorted groups of elements in the SCC 430. Process 330 includes further repeating recursively the sorting 420 and untangling 430 processes until all components are isolated 450.

Sorting elements into groups 420 includes sorting the elements into groups according to their ingoing and outgoing dependencies on other elements in other components of the SCC. The sorted groups of elements of each component in each SCC may be: an outgoing sources group (OS) comprising elements of the package that depend on elements in other components of the SCC, an incoming targets group (IT) comprising elements of the package that elements in other components of the SCC depend on, an incoming sources group (IS) comprising elements of other components of the SCC that depend on elements in the package, and an outgoing targets group (OT) comprising elements of other components of the SCC that elements in the package depend on. Sorting the elements to other types of groups and other number of such groups may be performed and is in the scope of the present invention.

According to some embodiments of the present invention, the package that includes the group with the smallest number of elements is untangled and isolated in each repetition of process 330 until all components are isolated 450.

According to some embodiments of the present invention, elements of incoming sources (IS) groups and outgoing targets (OT) groups may be allocated to the isolated package and removed from their original components.

Elements of outgoing sources (OS) groups and incoming targets (IT) groups are removed from the isolated component and allocated to another component of the SCC according to a pre-defined heuristic since there may be more than one component in the SCC that the removed elements may be added.

The pre-defined heuristic for moving the element to another component of the SCC may be finding and moving the element to the component that includes the elements that the element depend on or that the elements in the component depend on the allocated element. In the case that more than one such component is found, the pre-defined heuristic for moving the element to another component of the SCC, may be adding the element to the smallest component among the found components in the SCC, Alternatively, the element may be allocated to the component that includes most of the elements that the element depend on or most of the elements of the component depend on the allocated element or to a component selected randomly. The pre-defined heuristic for moving elements to other components described above is an exemplary heuristic and other heuristic may be used and are in the scope of the present invention.

As used herein, the term isolation complexity of a component means the size of the smallest group in a component where the size of a group is the number of elements in the group.

The calculation of the size of the sorted groups may be performed for all components in each SCC and the component that has the smallest isolation complexity may be selected for the iterative component isolation method illustrated in FIG. 4 flowchart.

Figure 5:
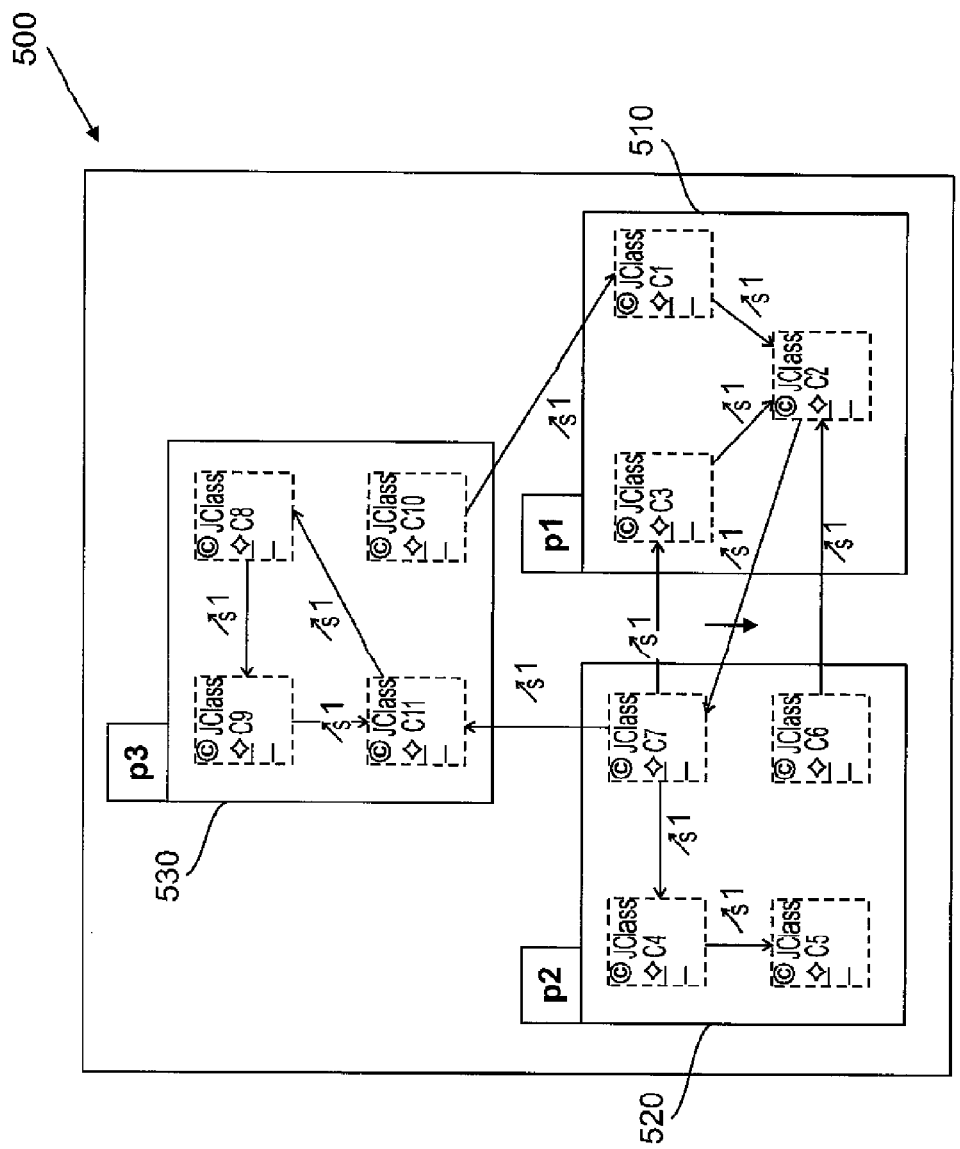
FIG. 5 is a schematic illustration that illustrates cyclic dependencies in an exemplary strongly connected component (SCC), according to some embodiments of the present invention.

FIG. 5 illustrates cyclic dependencies in an SCC, according to some embodiments of the present invention. SCC 500 includes 3 packages, P1 510, P2 520 and P3 530, where P1 includes 3 classes C1-C3, P2 includes 4 classes C4-C7 and P3 includes 4 classes C8-C11. The classes depend on classes of other packages and hence the packages are dependent on each other. For example class C3 of Package 1 depends on class C7 of package 2 and class C2 of package 1 depends on Class 7 of package 2 and thus package 1 and package 2 are cyclically dependent on each other as shown in FIG. 5.

FIG. 6 is a table that lists the sorted groups of each package of the exemplary SCC, according to some embodiments of the present invention. As shown, the smallest group in the SCC is the OS group of package 3 having only 1 class, C10, and hence package 3 has the smallest isolation complexity size. The computerized method for untangling cyclic dependencies between packages in software architectures is configured to select to untangle and isolate package 3 in its first iteration.

Figure 7:
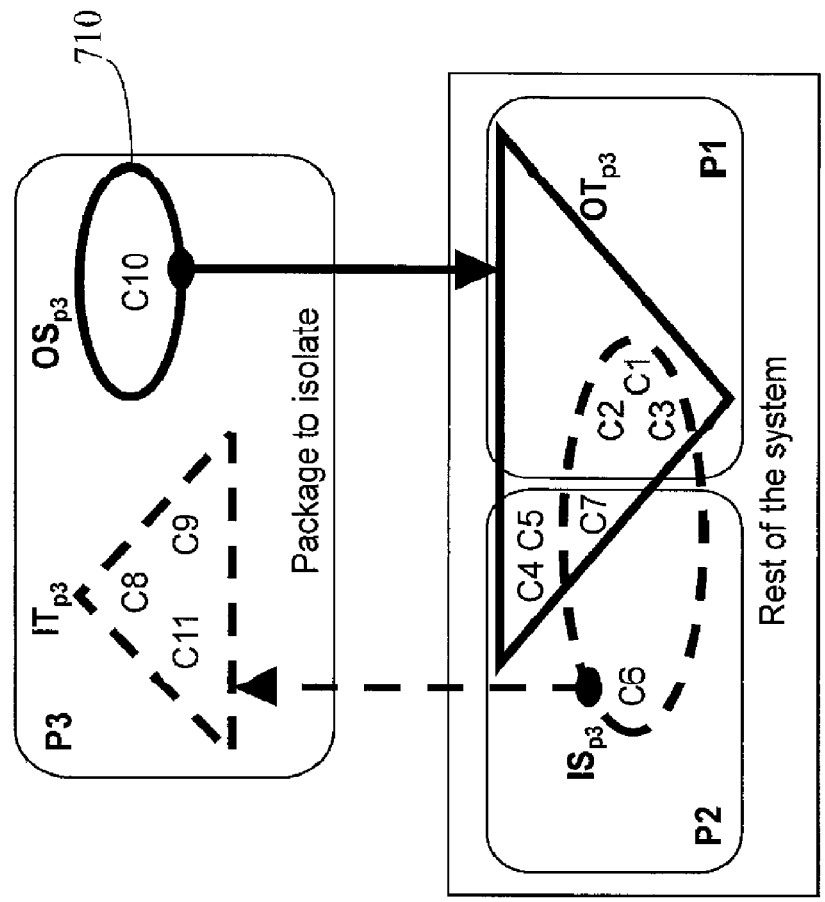
FIG. 7 is a schematic illustration that illustrates first iteration of a process for re-arranging classes in a received set of three packages of the exemplary SCC, according to some embodiments of the present invention.

FIG. 7 illustrates first iteration of a process for re-arranging classes in a received set of three packages of the exemplary SCC, according to some embodiments of the present invention. Package 3 has the smallest isolation complexity value and is selected to be isolated and removed from the SCC in the first iteration. Class C10 of Package 3 is in group OS (output sources) of P3, it depends on class C1 of package 1 and thus class C10 of package 3 is allocated to package 1 and package P3 is removed from the SCC.

Figure 8:
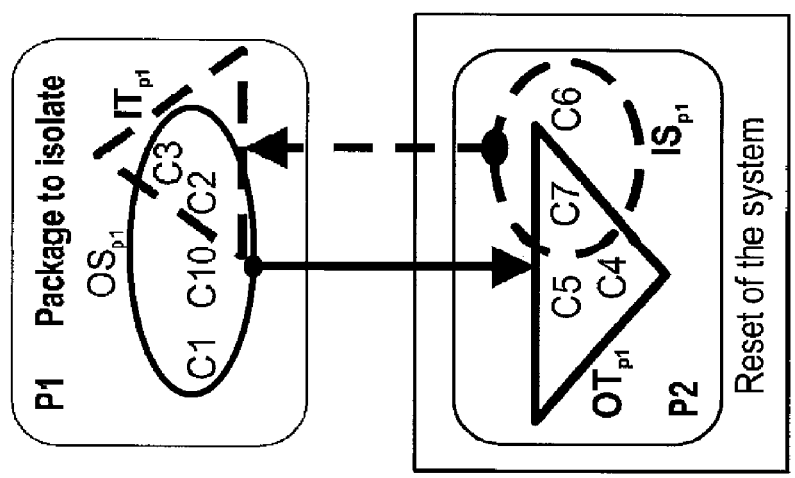
FIG. 8 is a schematic illustration that illustrates second iteration of re-arranging classes in the remaining two packages (the first iteration is illustrated in FIG.6) of the exemplary SCC, according to some embodiments of the present invention.

FIG. 8 illustrates second iteration of re-arranging classes in the remaining two packages (the first iteration is illustrated in FIG.6) of the exemplary SCC, according to some embodiments of the present invention. Computerized method 300 selects to untangle package 1 in its second iteration. Package 1 group IT has the smallest isolation complexity value of 2 in the second iteration and classes C6 and C7 from package 2 810 are allocated to package 1. Package 1 is isolated now, has no cyclic dependencies and is also removed from the SCC. The remaining package P2 is the last package of the SCC and has no cyclic dependencies left and hence it is isolated too and removed from the SCC. The SCC is empty now and the software architecture has no cyclic dependencies between its packages.

Figure 9:
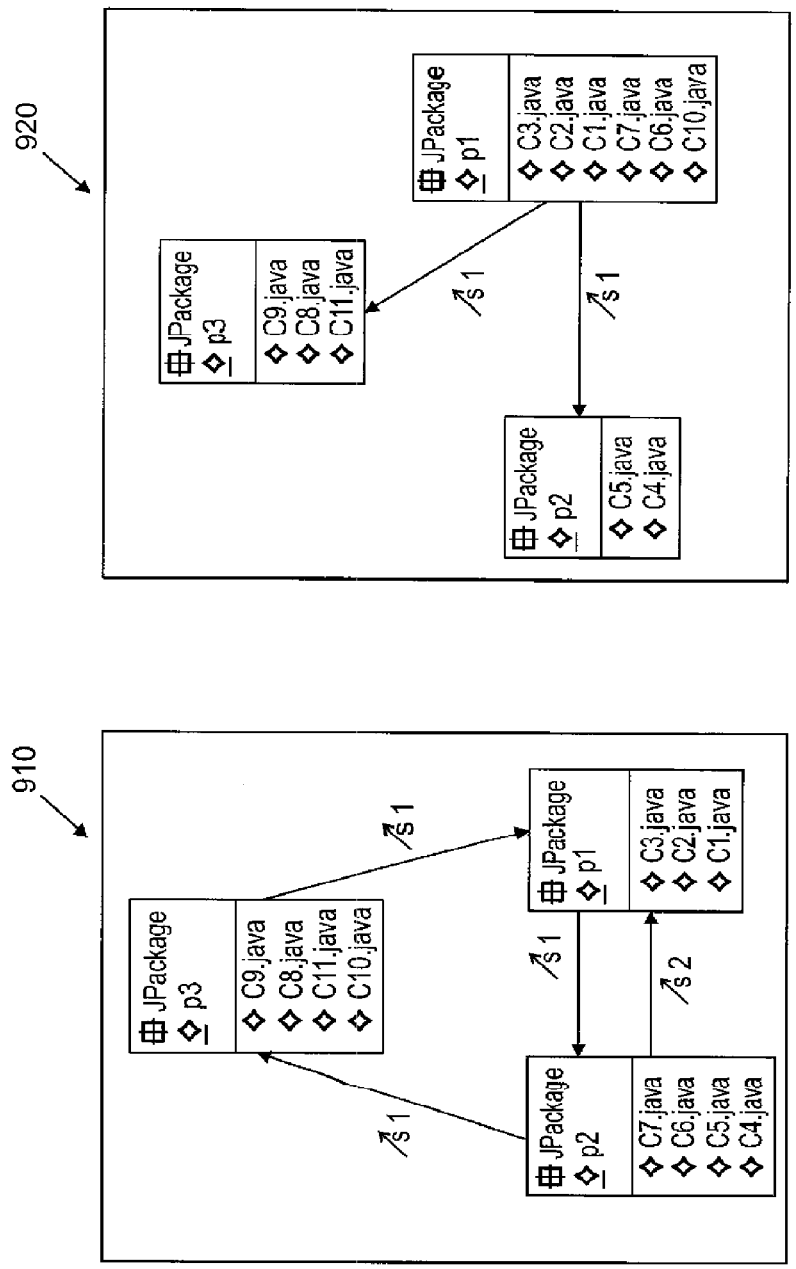
FIG. 9 is a schematic illustration that illustrates the received exemplary SCC and the rearranged packages output, according to some embodiments of the present invention.

FIG. 9 illustrates the received exemplary SCC packages and the rearranged packages output, according to some embodiments of the present invention. The received packages 910 included a cyclic dependence between package 1 and package 2. The rearranged packages 920 are untangled and have no cyclic dependency between packages 1 and 2. Rearranged package 1 includes classes C10 and classes C6 and C7 of original packages 3 and 2 respectively.

Method 300 is not limited to the detection of SCCs by Tarjan's algorithm (R. E. Tarjan, "Depth-first search and linear graph algorithms", SIAM J. Comput., vol. 1, no. 2, pp. 146-160, 1972), and other algorithms for computing SCCs may be used such as Kosaraju's algorithm or Gabow's algorithm.

Method 300 is designed to minimize the impact of the changes to the overall system architecture. The impact is minimized through the prioritized selection of the isolation complexity smallest group and through the pre-defined heuristics that may further select the changes that has the minimal impact on the software architecture.

Method 300 is not limited to software components per se, and cyclic dependencies between folders, projects, files, modules, elements and combinations thereof may be untangled. Furthermore, method 300 is not limited to elements within components and methods within elements, functions and variables within files and hardware cells within hardware modules may be rearranged in order to untangle cyclic dependencies between the higher level components.

For example, method 300 may be used to untangle cyclic dependencies between C program files. Assuming that there are two files File1.c and File2.c, wherein File1.c contains the functions f13 and f12. File2.c contains function f2. Assuming further that f11 calls f2 and f2 calls f12, a cyclic dependency between File1.c and File2.c exists.

To untangle the cyclic dependency described above between C program files, method 300 may move f2 from File2.c to File1.c. Alternatively method 300 may choose a different reorganization of the C code, depending on other dependencies that f11, f12 and f2 may have.

According to embodiment of the present invention, a computer program product for untangling cyclic dependencies between components in a software architecture is disclosed. The computer program product includes a computer readable storage medium that may further include first program instructions to receive a software architecture comprising a set of components where the components comprising further elements. The computer program product may include second program instructions to identify one or more cyclic dependencies between the components and third program instructions to create rearranged untangled components. The computer program product may include fourth program instructions to output the rearranged components. The program instructions may be stored on the computer readable storage medium.

Optionally, the computer program product third program instructions may further include instructions to detect SCCs and instructions to sort elements into groups of elements in each component and each SCC. The third program instructions may include instructions to untangle one or more component cyclic dependencies by moving one or more elements between components according to the sorted groups of elements.

The computer program product third program instructions may further include repeating recursively the sorting and untangling instructions until all SCC components are isolated in each SCC.

Advantageously, the computerized method for untangling cyclic dependencies between components in a software architecture described herein above untangles direct and indirect (transitive) cyclic dependencies and may generate a software architecture having no cycle dependencies.

Another advantage of the computerized method for untangling cyclic dependencies between components in a software architecture described herein above is that it minimizes the impact on the overall system architecture.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and computer program products will be developed and the scope of the terms processor, storage mediums, software architectures, components and elements is intended to include all such new technologies a priori.

As used herein the term "about" refers to □ 10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include one or more of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include one or more of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for removing dependencies between components in a software architecture, the computerized method implemented with memory-stored instructions that, when executed by a computer, cause the computer to perform the following steps, comprising:

identifying a plurality of dependencies between a plurality of software components in a software architecture by identifying for each of said plurality of software components in said software architecture, wherein each of said software components includes one or more software elements, an outgoing sources group of software elements of said software component that directly or indirectly depend on software elements in others of said plurality of software components, an incoming targets group of software elements of said software component that software elements in others of said plurality of software components directly or indirectly depend on, an incoming sources group of software elements in others of said plurality of software components that directly or indirectly depend on software elements in said software component, and an outgoing targets group of software elements in others of said plurality of software components that software elements in said software component directly or indirectly depend on;

for each of said groups determining a total number of said software elements in said group;

selecting one of said groups whose total number of said software elements is less than or equal to the smallest total number of said software elements of any other of said groups, and selecting any of said software elements in said selected group;

relocating any of said selected software elements from said software component that includes said selected software elements to a different one of said software components in accordance with a pre-defined heuristic, thereby eliminating any of said dependencies between said plurality of software components, wherein said pre-defined heuristic includes finding among the different ones of said software components, the software components that include software elements that said one of said selected software elements depend on, or that includes software elements that depend on said one of said selected software elements;

wherein said relocating includes either adding or moving one of said selected software elements to one of the found software components; and repeating said identifying, selecting, and relocating steps until no dependencies remain between said plurality of software components.

2. The computerized method of claim 1, wherein each of said software components is a package and each of said software elements is a class.

3. The computerized method of claim 1, wherein each of said software components is a file and each of said software elements is a function.

4. The computerized method of claim 1, wherein said software components are selected from the group consisting of: packages, folders, projects, files, classes, hardware modules and combinations thereof.

5. The computerized method of claim 1, wherein said software elements are selected from the group consisting of: classes, methods, functions, files, hardware cells, and combinations thereof.

6. The computerized method of claim 1, further comprising receiving constraints.

7. The computerized method of claim 6, wherein said constraints are selected from the group consisting of: unmovable software elements, minimal and maximal number of software elements requested in each software component, forced hierarchical relation between software components and combinations thereof.

8. The computerized method of claim 1, wherein said software architecture is selected from the group consisting of: program codes, software code of hardware modules and combinations thereof.

9. A computerized system for removing dependencies between software components in a software architecture, the system comprising:

a storage medium for receiving a set of software components of a software architecture and for storing a program code; and a processor for executing said program code, wherein said program code is configured to identify a plurality of dependencies between a plurality of software components in a software architecture by identifying for each of said plurality of software components in said software architecture, wherein each of said software components includes one or more software elements, an outgoing sources group of software elements of said software component that directly or indirectly depend on software elements in others of said plurality of software components, an incoming targets group of software elements of said software component that software elements in others of said plurality of software components directly or indirectly depend on, an incoming sources group of software elements in others of said plurality of software components that directly or indirectly depend on software elements in said software component, and an outgoing targets group of software elements in others of said plurality of software components that software elements in said software component directly or indirectly depend on, determine for each of said groups a total number of said software elements in said group, select one of said groups whose total number of said software elements is less than or equal to the smallest total number of said software elements of any other of said groups, and select any of said software elements in said selected group, relocate said selected software elements from said software component that includes said selected software elements to a different one of said software components in accordance with a pre-defined heuristic, thereby eliminating any of said dependencies between said plurality of software components, wherein said pre-defined heuristic includes finding among the different ones of said software components, the software components that include software elements that said one of said selected software elements depend on, or that includes software elements that depend on said one of said selected software elements;

wherein said relocating includes either adding or moving one of said selected software elements to one of the found software components; and repeating said identifying, selecting, and relocating steps until no dependencies remain between said plurality of software components.

10. A computer program product for removing dependencies between software components in a software architecture, the computer program product comprising: a non-transitory computer readable storage medium; and computer-readable program code embodied in the storage medium, wherein the computer-readable program code is configured to identify a plurality of dependencies between a plurality of software components in a software architecture by identifying for each of said plurality of software components in said software architecture, wherein each of said software components includes one or more software elements, an outgoing sources group of software elements of said software component that directly or indirectly depend on software elements in others of said plurality of software components, an incoming targets group of software elements of said software component that software elements in others of said plurality of software components directly or indirectly depend on, an incoming sources group of software elements in others of said plurality of software components that directly or indirectly depend on software elements in said software component, and an outgoing targets group of software elements in others of said plurality of software components that software elements in said software component directly or indirectly depend on, determine for each of said groups a total number of said software elements in said group, select one of said groups whose total number of said software elements is less than or equal to the smallest total number of said software elements of any other of said groups, and select any of said software elements in said selected group, relocate said selected software elements from said software component that includes said selected software elements to a different one of said software components in accordance with a pre-defined heuristic, thereby eliminating any of said dependencies between said plurality of software components, wherein said pre-defined heuristic includes finding among the different ones of said software components, the software components that include software elements that said one of said selected software elements depend on, or that includes software elements that depend on said one of said selected software elements;

wherein said relocating includes either adding or moving one of said selected software elements to one of the found software components; and repeating said identifying, selecting, and relocating steps until no dependencies remain between said plurality of software components.

\* \* \* \* \*